Oct. 29, 1968 R. E. SHAW 3,407,550
CONTINUOUS ONE-PIECE BIRD REPELLENT STRUCTURE
Filed Jan. 23, 1967
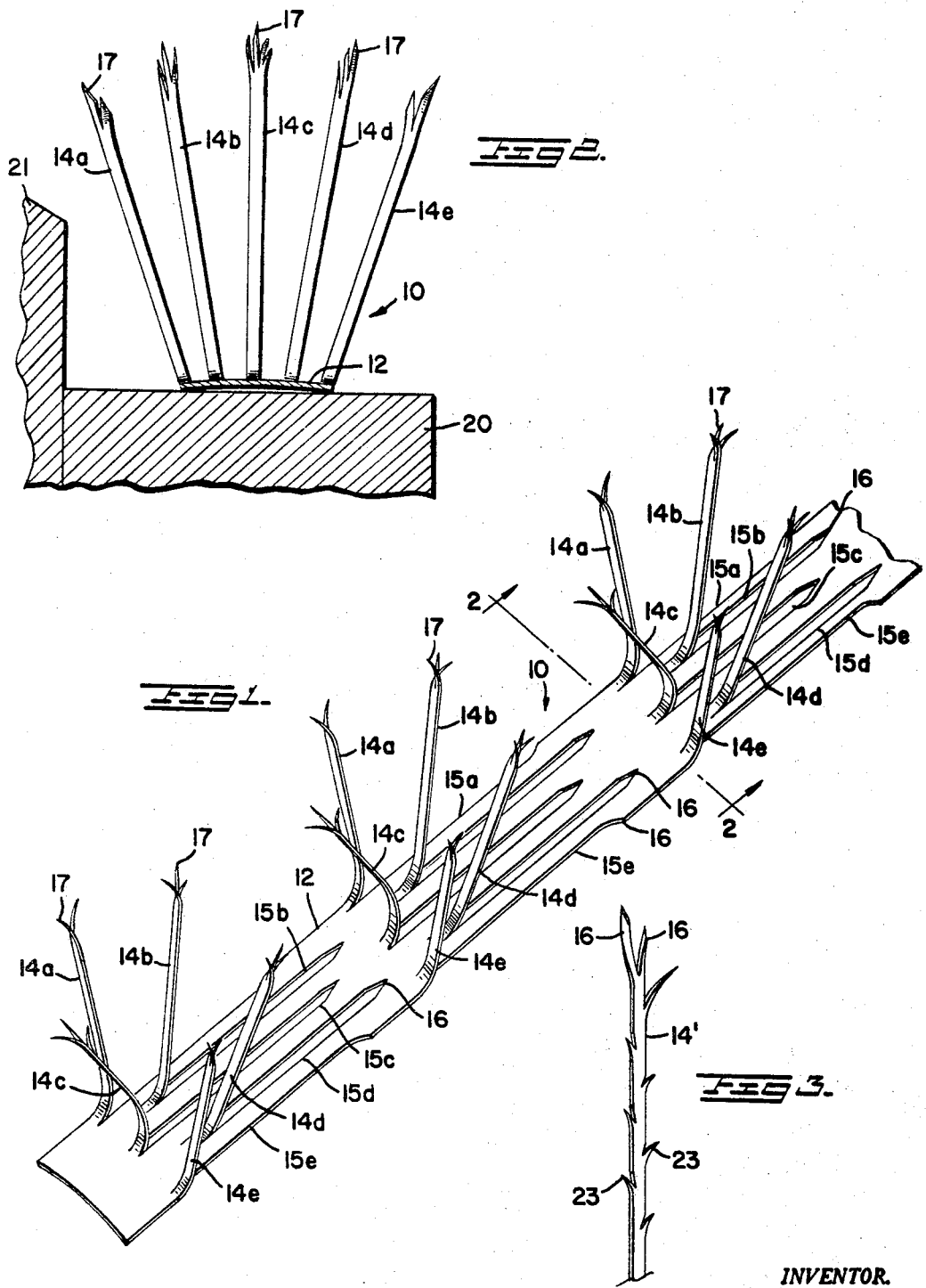
INVENTOR.
ROBERT E. SHAW
BY
ATTORNEYS United States Patent Office 3,407,550
Patented Oct. 29, 1968

3,407,550
CONTINUOUS ONE-PIECE BIRD
REPELLENT STRUCTURE
Robert Edward Shaw, 115 Merchant St., Johnstown, Pa.
15904; Mary Ellen Shaw, administratrix of said Robert
Edward Shaw, deceased
Filed Jan. 23, 1967, Ser. No. 610,927
7 Claims. (Cl. 52—101)

ABSTRACT OF THE DISCLOSURE

A bird repellent device manufactured from a single continuous sheet of metal having upstanding repellent members cut and bent from the sheet; the sheet being slightly arced whereby the elements cover an effective area substantially double the sheet width; the elements terminating at their upper ends in a multiplicity of sharp fingers and preferably including sharp side fingers.

Summary of disclosure

This invention relates to bird proofing and more particularly to unique structures for use on building windows and roof ledges which will prevent bird roosting or resting thereon. Specifically this invention provides a semi-continuous one piece structure which is easily attached to buildings to keep birds off without harming them while requiring substantially no maintenance.

Disclosure

The problem of bird proofing buildings has produced through the years a myriad of diverse proposals. These have included such elaborate systems as complete electric wiring of all possible roosting areas to sound emanaters to simulate either distress calls or natural bird enemy calls. Mechanical solutions have similarly been proposed in great profusion as evidence by numerous United States and foreign patents. Representative of these are United States patents to Peles 2,306,080, 2,475,047, and 2,938,-243; Burnside et al. 2,777,171; Kaufmann 2,888,716; Pavloff et al. 2,308,893; and Shaw et al. 3,282,000, the latter patent being partly the invention of the inventor of the instant application. Those establishments ultimately purchasing bird proofing devices have in most instances shunned the mechanical device in favor of the electrical or auditory ones principally for two reasons: first, the cost is much lower in the latter forms and, second, the mechanical devices look sufficiently awesome as to frighten people into believing that actual damage might be done some poor avian species. Further, since the mechanical devices were usually designed with a single type bird in mind, e.g. pigeon, it often was ineffective against other equally odious ones, e.g. starlings. Also most mechanical devices are multi part expensive affairs which must be assembled from a jumble of wires or finger devices involving besides proper part selection, individual bolting or other attaching of each component or set thereof thereby entailing a high installment cost. Probably the simplest approach to date was that shown in the Peles Patent 2,306,080 which used a stamped sheet of metal as the base with upstanding segments cut and bent therefrom. Although this approach appeared basically good it failed to solve the above problems in that in order to provide sufficient upstanding points of bird suppression it was necessary to either make the stamping extremely weak because of the multitude of points cut therefrom or add other parts by mechanical affixation. Where the upstanding point concept was utilized from a single sheet as in Peles there was left a very large amount of free open area in the base sheet for bird roosting and resting.

It is therefore an object of the instant invention to provide a bird proofing structure which serves as both an economical and efficient barrier to all size birds.

It is still a further object of the instant invention to provide an effective bird proofing structure of a semi continuous one piece construction which retains strength and rigidity without the addition of extraneous support or bird deterrent members.

It is another object of the instant invention to provide a bird proofing structure which is easily attached to any wood or masonry structure and which may be shipped thereto with minimal difficulty in either a final or unset roll form.

It is still another object of the instant invention to provide bird proofing structures which in their effectiveness are completely humane and thereby not subject to criticism by local bird fanciers.

These and other objects will become apparent from a reading of the following specification taken in conjunction with the drawing in which:

FIG. 1 is a fragmentary perspective view of an embodiment of the invention;

FIG. 2 is a sectional view taken along line 2—2 of FIG. 1 showing the FIG. 1 embodiment on a window or roofing ledge; and, FIG. 3 is a perspective view showing an alternative preferred embodiment of one of the bird deterrent members of the invention.

Referring more particularly to the drawing, there is shown therein in FIG. 1 the basic embodiment generally designated 10 of the instant invention wherein an elongated base support indicated at 12 is provided with groups of bird repellent members 14a, 14b, 14c, 14d, and 14e. These members are formed from metal bent from cut outs 15a and 15e formed in the side of base 12 and cut outs 15b, 15c and 15d formed in the central portion of base 12. These cut outs terminate at one end at the bent junction with the repellent members and at the other end in substantial points shown as 16. The repellent members 14a, 14b, 14d and 14e divide at their upper ends into sharply pointed fingers 17 formed by slitting and bending the metal point cut from portion 16 of cut outs 15a, 15b, 15c, 15d and 15e. These fingers as shown in FIG. 1 are not only divided laterally of the base 12 as shown in FIG. 2 but also lengthwise thereof as shown in FIG. 1. The cut outs 15b and 15d are offset from the lateral plane of cut outs 15a, 15c and 15e whereby a multi planar layout of the fingers is attained.

The number of fingers on each member may vary dependent upon the width of the element and the thickness of the sheet from which the repellent device is formed. At least two and up to four or five may be cut from the member end but it is preferred for maximum repellency to utilize at least three as shown on member 14b and 14d in FIGS. 1 and 2.

The mounting of the device is shown in FIG. 2 with the base 12 resting on the ledge 20 adjacent a sill support 21. The means of attaching the repellent device may take many forms including masonry nails (not shown) through the cut outs 14b, 14c and/or 14d or side clamps (not shown) attached in overlapping relation to the side cut outs 14a and/or 14e.

As best seen in FIG. 2 the base 12 is provided with a slight arc whereby the elements 14a, 14b, 14c, 14d and 14e are fanned to cover an effective area substantially double the base width.

The general configuration shown in FIG. 1 is most suitable for installations whereby larger birds such as pigeons present the major problem. Where the combined menace of pigeons and starlings is prevalent it is preferred to utilize the alternative embodiment repellent members 14' shown in FIG. 3. In this structure, additional side fingers 23 are cut from the repellent member. These side fingers cause irritation to the sides and feet of any small bird such as a starling who otherwise could roost in between the members 14a, 14b, 14c, 14d and 14e, shown in FIG. 1.

Although the drawings shown are not to exact scale they do show the size relationship of the various components. In actual practice the elements are approximately 3″ long with the fingers of one half inch length. As shown in FIG. 1 the elements 14a, 14c and 14e are offset from elements 14b and 14d by approximately one half inch at the bend points with the base 12. The side fingers 23, shown on the alternative embodiment of FIG. 3, are approximately one-quarter inch in length. The groupings are separated by an effective distance of less than the length of the members due to the angling of the members discussed infra. As is apparent from the drawings, the distance between adjacent groups of said repellent members is greater than the length of the individual members. Further, the individual members of each group are separated from each other by a distance less than the length of said individual members.

As shown in FIG. 1 the members 14a, 14b, 14c, 14d, and 14e are so angularly disposed as to produce a substantially pentagonal pattern. This is accomplished by bending members 14a, and 14e, substantially vertically to base 12, bending members 14b and 14d towards the next adjacent element grouping and bending member 14c oppositely into the manner of 14b and 14d. If a substantially vertical arrangement of all members is desired as in the case where light gauge metals are the material of construction, it is possible to orient the cut outs 15a, 15b, 15c, 15d and 15e into such a pattern.

Although the details of the instant invention have been described with relation to a five repellent member grouping, it is sometimes possible to utilize only three members as where the base ledge for protection is extremely narrow. Similarly in some wide ledge applications a multiplicity of the unit shown in FIG. 1 may be utilized in parallel or special wide base members manufactured having more than five repellent members in a group.

The bird repellent structure of the instant invention is most desirably fabricated from 18 gauge 18–8 stainless steel although lighter or heavier gauge steels as well as other construction materials may be utilized. The stainless steel was selected for its known corrosion resistance which allows a substantially maintenance free structure. Manufacture may be accomplished by conventional metal cutting techniques, it being preferred to pass a 1½″ sheet steel through a double set of cutter rollers, the first set cutting the basic member with the second set cutting the member point into fingers. The sheet may then be immediately passed over appropriate push rods which bend the member from the base. The fingers are then divided by appropriate spreaders. Alternatively after cutting the sheet steel may be rolled into a coil for shipping and subsequent erection. All of the automatic operations noted above except the first cutting may also be easily performed by hand. The arc of the base 12 may be applied immediately after the cutting by passage of the strip through appropriate rollers. This not only sets the arc but tends to release the repellent elements from their cut outs.

In view of the shortness of the sharp fingers both on the tops of the repellent members and on the sides it has been discovered that any bird coming into contact therewith is merely pricked rather than being impaled. Thus this device although slightly pricking the bird's feet does no permanent damage thereto. Thus such a device should not be objectionable to local bird fanciers.

While particular embodiments of the invention have been shown, it will be understood, of course, that the invention is not limited thereto, since many modifications may be made, and it is, therefore, contemplated by the appended claims to cover any such modifications as fall within the true spirit and scope of the invention.

What is claimed and desired to be secured by Letters Patent of the United States is:

1. A bird repellent structure adaptable for quick attachment to window ledges and the like, said structure including a continuous rigid base having cut and bent therefrom a multiplicity of groups of repellent members along the length of said base whereby elongated parallel cut outs are provided in said base, each member being substantially parallel sided terminating in pointed end portions which are divided to provide at least two sharp fingers, at least one of the members of each group joining the base at a point longitudinally removed from the plane of joinder points of the other members of the group, the distance between adjacent groups of said repellent members being greater than the length of the individual members, said individual members of each group being separated from each other by a distance less than the length of said individual members.

2. The bird repellent structure of claim 1 wherein said base is slightly arced whereby each group of repellent members provides a repellent area approximately twice the width of the base.

3. A bird repellent structure in accordance with claim 1 wherein each group of repellent members has five members so arranged and bent from said base that their upper ends form a regular pentagonal pattern.

4. A bird repellent structure in accordance with claim 1 wherein each of the repellent elements has a multiplicity of side sharp fingers cut therefrom.

5. The bird repellent structure in accordance with claim 1 wherein at least one of said repellent members has at least three terminal fingers.

6. The bird repellent structure in accordance with claim 1 wherein at least one of said repellent members has at least four fingers.

7. A bird repellent structure adaptable for quick attachment to window ledges and the like, said structure including a continuous rigid base having cut and bent therefrom a multiplicity of groups of repellent members along the length of said base whereby elongated parallel cut outs are provided in said base, each repellent member terminating at its upper end in at least two sharp fingers, said base being slightly arced whereby each group of repellent members provides a repellent area approximately twice the width of the base, and each group of said repellent members having five members so angled and bent from said base that their upper ends form a regular pentagonal pattern, two of said members joining the base at a point longitudinally removed from the plane of joinder points of the other three.

References Cited

UNITED STATES PATENTS

| 185,593 | 12/1876 | Topliff | 256—11 |
| 974,722 | 11/1910 | Swanson | 52—101 |
| 1,559,734 | 11/1925 | Barton | 256—11 |
| 3,143,030 | 8/1964 | Muller | 85—13 |
| 3,282,000 | 11/1966 | Shaw et al. | 52—101 |

FOREIGN PATENTS 123,870   1/1928   Switzerland.

FRANK L. ABBOTT, *Primary Examiner.*

PRICE C. FAW, JR., *Assistant Examiner.*